March 27, 1928.
L. R. CLAUSEN
SIDE DELIVERY RAKE
Filed July 10, 1919
1,663,793
2 Sheets-Sheet 1
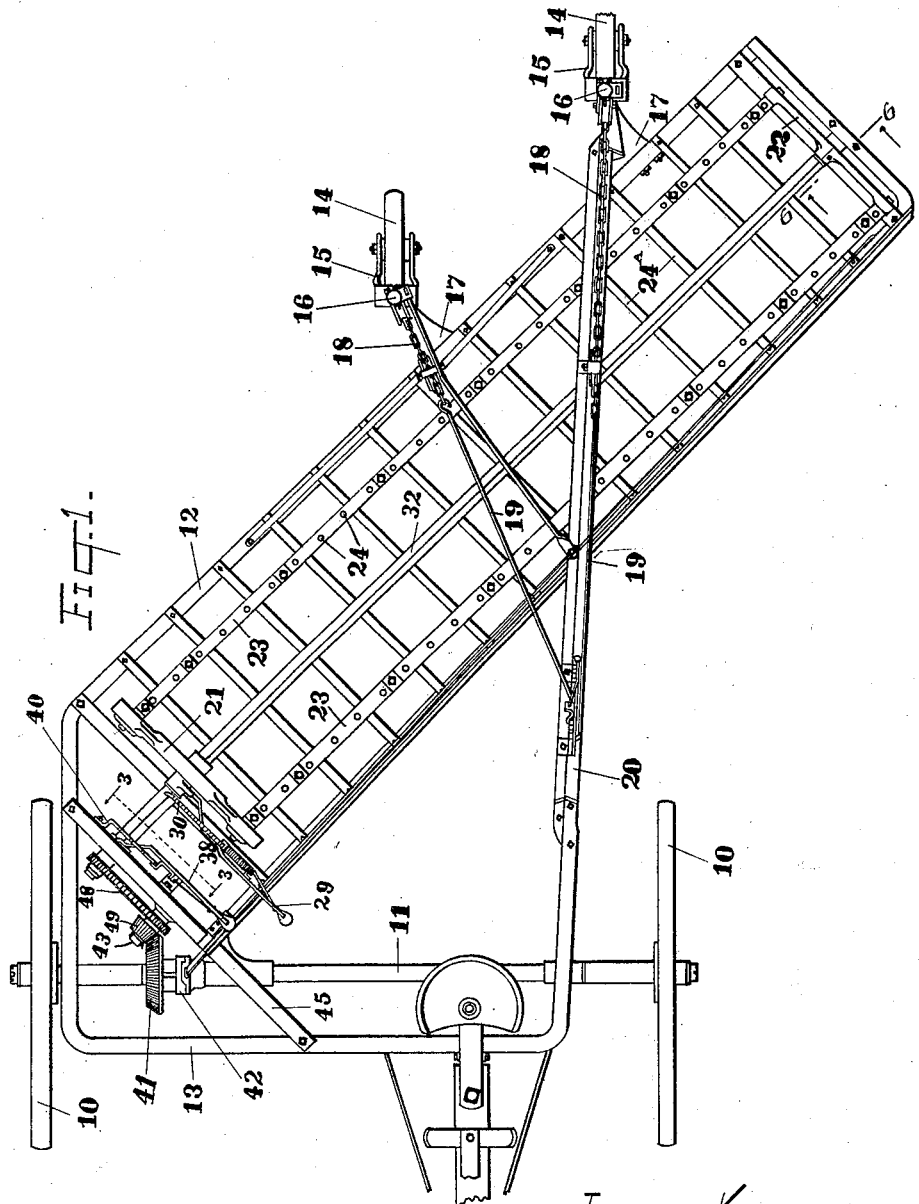

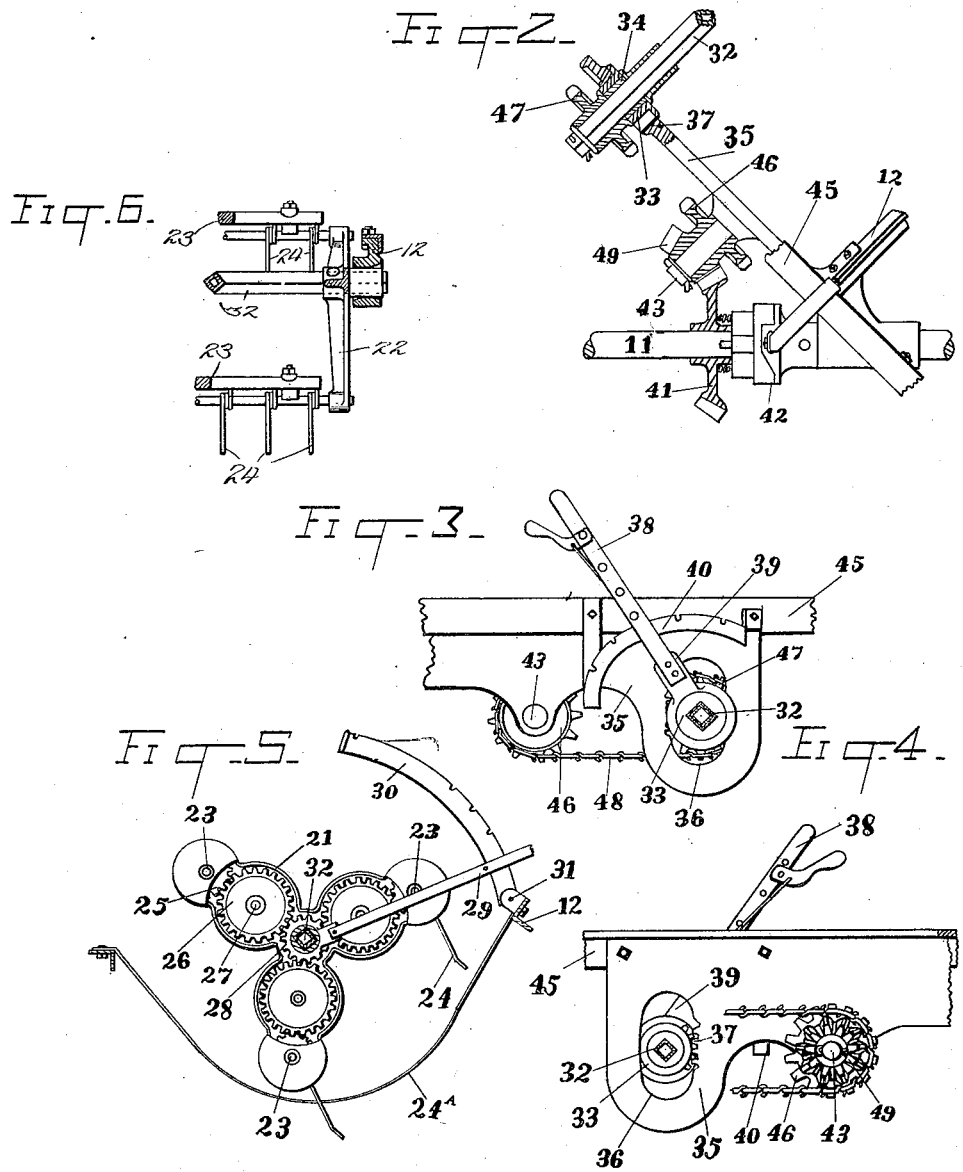

Patented Mar. 27, 1928.

1,663,793

UNITED STATES PATENT OFFICE.

LEON R. CLAUSEN, OF MOLINE, ILLINOIS, ASSIGNOR TO THE DAIN MANUFACTURING COMPANY OF IOWA, OF OTTUMWA, IOWA, A CORPORATION OF IOWA.

SIDE-DELIVERY RAKE.

Application filed July 10, 1919. Serial No. 309,906.

This invention relates to side-delivery rakes of that type wherein a frame carrying the rotary reel journaled therein is arranged at an angle to the line of draft, such reel carrying several series of rake teeth, all of which teeth are maintained at substantially the same angle so as to be presented in the same manner to the hay that is to be raked into windrows. Said several series of teeth are held in the desired uniform working position by the employment of suitable mechanism that is carried by the forward or inner reel-head, such mechanism comprising, ordinarily, a set of gears in connection with each tooth bar and a single other gear that lies centrally of the several sets and is in mesh with the inner gear of each of said sets.

It has been the common practice to provide at the rear of the diagonally-arranged reel-frame means for supporting such frame, such means usually being one or more caster-wheels, and between these caster-wheels and the frame a relative adjustment could be effected, the frame during such adjustment turning about the main axle of the machine as an axis. In such adjustment, of course, it is evident that the outer or rear end of the frame and the outer or rear end of the reel supported therein would move through a greater arc than the forward or inner end of the frame and reel, and as it is sometimes deemed desirable that the other or inner end of the reel be given a greater amount of vertical movement than is given to such end by the character of adjustment referred to above, various attempts have been made to provide for this supplemental adjustment, but such supplemental adjustment has always been, so far as I know, of a character that affected the frame itself. It is the object of this invention to provide means for separately and independently adjusting the inner end of the reel as distinguished from any adjustment of the frame that carries the reel with it. I accomplish this object by the means shown in the drawings and hereinafter particularly described. That which I believe to be new is set forth in the claims.

In the drawings,

Fig. 1 is a plan view of a side-delivery rotary rake embodying my improvements;

Fig. 2 is a view partly in plan and partly in horizontal section and illustrating the means for driving the reel from the rotation of the axle of the machine;

Fig. 3 is a detail, being an inner face view of the means for vertically adjusting the inner end of the reel-shaft, said shaft being shown in section, and the section being taken at line 3—3 of Fig. 1;

Fig. 4 is an outer end view of the parts shown in Fig. 3;

Fig. 5 is a detail of the gearing carried by the forward reel-head, and showing also the lever connected to the inner member of the gearing for causing an adjustment of said gearing to change the angle of the rake-teeth, said lever being shown in connection with a pivotally-mounted sector; and Fig. 6 is a detail being a sectional view taken substantially on the line 6—6 of Fig. 1, and illustrating the loose fit of the rear or outer end of the reel-shaft in its bearing to permit the forward end of such shaft to be vertically adjusted.

Referring to the several figures of the drawings,—10—10 indicate a pair of carrying wheels mounted upon an axle 11. Such axle and wheels will be connected together by any suitable means that will compel a rotation of the axle during the forward motion of the machine, but which will not cause the axle to rotate when the machine is backed. Such connecting means between a wheel and an axle are well understood in the art and I have, therefore, not deemed it necessary to here describe or illustrate the same. 12 indicates an ordinary diagonally-disposed reel-frame which is connected with the axle 11 so as to rock freely thereon when the frame is adjusted relative to its usual rear ground-engaging support or supports. In the construction shown the connecting of the frame 12 is through the medium of a bent supplemental frame member 13 that is rigidly connected with and forms an extension of the main frame 12. I have shown the machine provided with two ground-engaging supports in the form of caster-wheels, each of which is indicated by 14. Each caster-wheel is mounted in a yoke 15 from which rises a standard 16 that has a sliding connection in bearings carried by an arm 17 secured to and projecting rearwardly from the frame 12. From each standard extends a connection comprising a chain member 18 and a link member 19, the forward ends of the link members of both the connections being connected to a common adjusting lever that is mounted on the usual long truss bar 20 that extends from the wheeled support back and over the reel-frame. The chain members 18 of each connection pass under suitable pulleys journaled on the reel-frame so that when a pull is exerted on the connections 18—19 by means of their common lever on the truss bar the frame will be adjusted vertically relative to the supporting caster-wheels. The details of this frame-adjusting mechanism are fully shown and described in Letters Patent No. 1,313,880, dated August 26, 1919, granted upon my application.

The reel that is rotatably mounted in the frame 12 comprises two heads connected together by a plurality of bars, to which bars the rake-teeth are connected in the usual manner. The inner or forward one of these reel-heads is indicated by 21 and the outer or rearmost reel-head is indicated by 22. As shown, three of the tooth-bars above-mentioned are employed and each is indicated by the numeral 23. The rake-teeth that are carried by these bars are indicated by 24. 24^A indicates curved guards that are secured to the front and rear members of the reel-frame, the function of such guards being to free the rake-teeth from any hay that might tend to be carried around with the teeth.

The inner or forward reel-head 21 has rotatably secured on its outer face a plurality of sets of gears, the number of sets corresponding in number to the number of the tooth-bars 23, and in the outer gear of each set the forward end of one of the tooth-bars will be secured as usual. In Fig. 5 an end view of the reel is shown, which also shows the three sets of gears mentioned. The outer gear of each of these three sets is indicated by 25 and the gears that are in mesh, respectively, with these outer gears are indicated by 26, each of these latter gears being journaled upon a pin 27 made fast to the reel-head. Each of the gear members 26 is in mesh with a smaller central gear 28 which is normally held fixed against rotation, but which by reason of being mounted on a cylindrical hub member, as shown, may be rocked in order to effect a change in the position of the several tooth bars so as to incline to the desired extent the rake-teeth 24 that are carried by such bars. In said Fig. 5 there is shown a lever and a movable sector construction, by the use of which this rocking of the central gear may be accomplished. The lever is indicated by 29 and is rigidly fixed at its inner end to the central gear 28, and its outer end portion extends alongside of the sector referred to so as to be locked thereto at any desired point by means of an ordinary spring latch (not shown) carried by the lever. The notched sector referred to is indicated by 30. It is pivotally attached at 31 to the front bar of the reel-frame 12, and its under edge rests loosely upon a pin or bracket projecting from the lever. This lever and pivoted sector construction is set forth more in detail in Letters Patent, No. 1,283,674, dated November 5, 1918, granted upon my application. 32 indicates the usual central shaft of the reel, and upon which the reel-heads 21 and 22 are suitably secured so as to turn therewith. The shaft is preferably angular in cross-section as shown. The outer end bearing for the shaft is to be large enough as shown in Fig. 6 so as to permit the shaft to have a limited rising and falling movement when power is applied to the inner end thereof, as hereinafter described, in order that the forward or inner end of the reel may be adjusted independently of any adjustment given to its supporting frame, as hereinbefore described in connection with the rear ground-supports 14. In order to effect this independent vertical adjustment of the forward or inner end of the reel-shaft such inner end is supported in an adjustable member capable of being held in different adjusted positions in a vertically slotted bracket depending from the framework. The adjustable member referred to is a pinion, indicated by 33, pivotally mounted upon the cylindrical surface of a short sleeve 34 on the reel-shaft 32. 35 indicates a bracket secured to and depending from the framework and provided with a vertical slot 36 in the forward edge of which is formed, as shown, a series of teeth 37 that constitute a rack with which the teeth of the pinion 33 are in constant engagement. Inasmuch as the rack 37 is comparatively short the entire periphery of the pinion is not provided with teeth and hence such pinion is what is ordinarily termed a mutilated pinion. The untoothed portion of the periphery of the pinion bears against the opposite edge of the slot and thus ensures the teeth of the pinion being held in engagement with the rack. The raising and lowering of the inner or forward end of the reel-shaft is accomplished by means of an adjusting lever 38 fulcrumed coaxially with the reel shaft, which lever, as best shown in Fig. 3, is bolted to an arm 39 that is formed integral with an annular flange on the outer end of the mutilated pinion, such flange bearing against the inner face of the bracket 35 at each side of the longitudinal slot. As this lever 38 is turned it is evident that through the meshing of the teeth of the mutilated pinion 33 with the rack 37 the pinion must be vertically moved according to the direction in which the lever is moved and, of course, will carry with it the reel-shaft that projects through and has a bearing in such mutilated pinion. When the desired adjustment has been attained the adjusting lever 38 can be locked to a notched segment 40, the engagement of the lever with the segment being by means of an ordinary spring latch (not shown) carried by the lever.

It will be noted that the end spaces or valleys in the rack 37 with which the end teeth of the mutilated pinion 33 respectively engage when the reel-shaft is raised or lowered to its greatest extent are of decidedly different shape than the intermediate spaces or valleys of such rack, such different shape of the end spaces or valleys being due to the sharp pitch or inclination given to their sides, as clearly shown in Fig. 4. So shaping such end spaces or valleys provides them with wide mouths, and in each instance permits the end tooth of the pinion that enters therein to remain therein while the pinion is moving forward on the arc of a circle whose axis is coincident with the axis of the sprocket 46. It will be noted that the slot 36 extends at each end a considerable distance past the end of the rack 37 in its forward edge and by reason of such extra length the pinion 33 can be rocked by means of the lever 38 a considerable distance in excess of the length of the toothed rack, and during such excess movement one of the end teeth of the pinion will turn on its cooperating end tooth of the rack, such end tooth thereby forming a fulcrum around which the pinion is bodily moved, such bodily movement being permitted by reason of the wide mouth of the space or valley that such end tooth of the pinion engages, and such bodily movement being compelled by reason of the curved rear edge of the slot that the untoothed portion of the pinion is in constant engagement with. Such pivotal action of an end tooth of the pinion on an end tooth of the rack with the accompanying forward bodily turning of the pinion maintains the sprocket chain at approximately the same tension whether the pinion be moved to either end of the slot 36 or be held at any point intermediate of such ends, which renders it unnecessary to provide any tensioning device, such as is ordinarily required when a vertical adjustment is made of one rotatable member relative to another similar member that is connected to it by a sprocket chain or belt.

The means for rotating the reel comprise in the construction shown a large bevel gear 41 carried on the axle 11 and adapted to be connected with said axle so as to rotate therewith at will by any suitable clutch mechanism—a clutch for this purpose being indicated generally in Figs. 1 and 2 by the numeral 42. In mesh with this bevel gear 41 is a bevel pinion 49 journaled upon a heavy pin 43 projecting from the outer face of the bracket 35 that depends from a member of the framework, as before stated,—such member of the framework, in the construction shown, being a diagonally-arranged bar 45 that extends between the side and front bars of the supplemental frame member 13. Connected with the bevel pinion 49—preferably integral therewith as shown—is a sprocket 46, and in line with said sprocket is another sprocket 47 fast upon the projecting end of the reel-shaft 32, and around these two sprockets 46 and 47 extends an endless sprocket chain 48.

It is evident that upon the forward movement of the machine, and with the large gear 41 driven from the rotating axle 11, the gearing interposed between such member 41 and the reel-shaft will cause a rotation of such shaft, and inasmuch as the degree of vertical adjustment effected by a manipulation of the lever 38 is comparatively small such adjustment will not in any wise affect the reel driving mechanism. Thus it will be seen that in addition to the usual adjustment of the frame and reel an independent adjustment is afforded for the inner end of the reel itself, which, like the first-mentioned adjustment, may be made use of at any time during the operation of the machine. Furthermore, regardless of the extent to which the reel-frame may be adjusted as described, or the extent to which the inner end of the reel alone may be independently adjusted, the means for holding the gearing on the inner reel-head normally locked in place to preserve the various teeth in their required position will not be found to offer any interference to such adjusting movements because of the fact that the sector 30 to which the gear adjusting lever 29 is in engagement can and will always turn on its pivot 31 to allow for such frame and reel adjustments.

What I claim as my invention and desire to secure by Letters Patent, is—

1. In a side-delivery rotary rake, the combination of a wheeled support comprising a rotatable axle, a diagonally-extending frame having its forward end portion pivotally connected with said wheeled support, a rotatable reel carried by said frame and comprising a shaft journaled in the frame, the outer end of said shaft being journaled loosely in a bearing to permit the other end of the shaft to have a limited vertical adjustment, a sprocket wheel fast on said shaft, a second sprocket wheel rotatably mounted on the frame in advance of the first-named sprocket, an endless chain passing over said sprockets, means for driving said sprockets and chain from the rotatable axle, and means for vertically adjusting the inner end of said reel-shaft, said adjusting means comprising a toothed member on the reel-shaft and turnable relatively thereto and a fixed rack with which said toothed member meshes.

2. In a side-delivery rotary rake, the combination of a wheeled support comprising a rotatable axle, a diagonally-extending frame having its forward end portion pivotally connected with said wheeled support, a rotatable reel carried by said frame and comprising a shaft journaled in the frame, a sprocket wheel fast on said shaft, a second sprocket wheel rotatably mounted on the frame in advance of the first-named sprocket, an endless chain passing over said sprockets, means for driving said sprockets and chain from the rotatable axle, and means for vertically adjusting the inner end of said reel-shaft, said adjusting means comprising a toothed member adjacent the inner or forward end of the reel-shaft and turnable relatively thereto, a slotted bracket fixedly secured to the frame and having one edge toothed to form a rack with which said toothed member engages, and a lever secured to the toothed member.

3. In a side-delivery rotary rake, the combination of a wheeled support comprising a rotatable axle, a diagonally-extending frame in rear of and pivotally connected with said wheeled support, a reel having a shaft rotatably mounted in said frame, means for rocking said frame on its pivotal connection with the wheeled support to adjust both the frame and reel vertically, a toothed member turnable on the reel-shaft adjacent its forward or inner end, a vertical rack with which said toothed member is in engagement, means for turning said toothed member on said rack to cause a vertical adjustment of the reel-shaft, and means connecting the forward or inner end of the reel-shaft with said axle for driving the reel in any of its adjusted positions, said last-named means comprising a sprocket wheel fast on the reel-shaft, a second sprocket wheel rotatably mounted on the frame in advance of the first-named sprocket wheel, an endless chain passing over said sprockets, and gearing interposed between and connected, respectively, with the axle and said second-named sprocket.

4. In a side delivery rake, the combination of a wheeled support, a diagonally-arranged frame in rear of said wheeled support and connected therewith, a reel rotatably supported by said frame, means for rotating said reel by the forward movement of the machine, and means for vertically adjusting the inner end of said reel comprising a turnable member disposed co-axially therewith, and means cooperating with said turnable member and operating by turning thereof to move the reel vertically.

5. In a side delivery rake, the combination of a wheeled support, a diagonally-arranged frame in rear of said wheeled support and connected therewith, a reel rotatably supported by said frame, means for rotating said reel by the forward movement of the machine, and means for vertically adjusting the inner end of said reel comprising a turnable member disposed co-axially therewith and turnable independently thereof, and means carried by the frame and cooperating with said turnable member to move said reel vertically by turning of said turnable member.

6. In a side delivery rake, the combination of a wheeled support, a diagonally-arranged frame in rear of said wheeled support and connected therewith, a reel shaft rotatably supported by said frame, means for rotating said shaft by the forward movement of the machine, and means for vertically adjusting the inner end of said shaft comprising a turnable member disposed co-axially with said shaft, means cooperating with said turnable member and operating by turning thereof to move said shaft vertically, and means for turning said turnable member.

7. In a side delivery rake, the combination of a wheeled support, a diagonally-arranged frame in rear of said wheeled support and connected therewith, a reel shaft rotatably supported by said frame, means for rotating said shaft by the forward movement of the machine, and means for vertically adjusting the inner end of said shaft comprising a turnable member mounted on said shaft and turnable independently thereof, means mounted on said frame and cooperating with said turnable member to move said shaft vertically, and means for turning said turnable member.

8. In a side delivery rake, the combination of a wheeled support, a diagonally-arranged frame in rear of said wheeled support and connected therewith, a reel shaft rotatably supported by said frame, means for rotating said shaft by the forward movement of the machine, and means for vertically adjusting the inner end of said shaft comprising a pinion disposed co-axially with said shaft, a rack cooperating with said pinion and operating by turning thereof to move said shaft vertically, and means for turning said pinion.

9. In a side delivery rake, the combination of a wheeled support, a diagonally-arranged frame in rear of said wheeled support and connected therewith, a reel shaft rotatably supported by said frame, means for rotating said shaft by the forward movement of the machine, and means for vertically adjusting the inner end of said shaft comprising a pinion mounted on said shaft and turnable independently thereof, a rack fixed on said frame and cooperating with said pinion to move said shaft vertically, and means for turning said pinion.

10. In a side delivery rake, the combination of a wheeled support, a diagonally-arranged frame in rear of said wheeled support and connected therewith, a reel shaft rotatably supported by said frame, means for rotating said shaft by the forward movement of the machine, and means for vertically adjusting the inner end of said shaft comprising a turnable member disposed co-axially with said shaft, means cooperating with said turnable member and operating by turning thereof to move said shaft vertically and effect forward movement thereof as the shaft approaches the limit of its vertical movement, and means for turning said turnable member.

11. In a side delivery rake, the combination of a wheeled support, a diagonally-arranged frame in rear of said wheeled support and connected therewith, a reel shaft rotatably supported by said frame, means for rotating said shaft by the forward movement of the machine, and means for vertically adjusting the inner end of said shaft comprising a mutilated pinion mounted on said shaft and turnable independently thereof, a stationary rack carried by said frame and cooperating with said pinion to move said shaft vertically and to effect forward movement thereof as the shaft approaches the limit of its movement, and means for turning said pinion.

12. In a side delivery rake, the combination of a wheeled support, a diagonally-arranged frame in rear of said wheeled support and connected therewith, a reel shaft rotatably supported by said frame, means for rotating said shaft by the forward movement of the machine, and means for vertically adjusting the inner end of said shaft comprising a lever fulcrumed co-axially with said shaft, and means actuated by said lever for moving said shaft vertically.

13. In a side delivery rake the combination with a wheeled support, a diagonally-arranged frame in rear of said support and connected therewith, a reel shaft rotatably supported by said frame, a drive wheel driven by the forward movement of the machine and connected with said reel shaft for driving the same, and means for vertically adjusting the inner end of said shaft comprising a turnable member disposed co-axially with said shaft, and means cooperating with said turnable member and operating by turning thereof to move said shaft vertically and meanwhile maintain it a substantially constant distance from the axis of said drive wheel.

14. In a side delivery rake the combination with a wheeled support, a diagonally-arranged frame in rear of said support and connected therewith, a reel shaft rotatably supported by said frame, a drive wheel driven by the forward movement of the machine and connected with said reel shaft for driving the same, and means for vertically adjusting the inner end of said shaft comprising a turnable pinion mounted on said shaft and turnable independently thereof, a bracket secured to said frame and having a curved slot adapted to receive said pinion and a rack meshing therewith, and means for turning said pinion.

15. In a side-delivery rotary rake, the combination of a wheeled support comprising a rotatable axle, a diagonally-extending frame having its forward end portion pivotally connected with said wheeled support, a rotatable reel carried by said frame and comprising a shaft journaled in the frame, a sprocket wheel fast on said shaft, a second sprocket wheel rotatably mounted on the frame in advance of the first-named sprocket, an endless chain passing over said sprockets, means for driving said sprockets and chain from the rotatable axle, and means for vertically adjusting the inner end of said reel shaft, said adjusting means comprising a toothed member adjacent the inner or forward end of the reel shaft and turnable relatively thereto, a slotted bracket fixedly secured to the frame and having a portion of its forward edge toothed to form a rack with which said toothed member engages and having its rear edge curved to compel said toothed member to rock forward bodily on one of the end teeth of the rack, and means for moving said toothed member.

16. In a side-delivery rotary rake, the combination of a wheeled support comprising a rotatable axle, a diagonally-extending frame having its forward end portion pivotally connected with said wheeled support, a rotatable reel carried by said frame and comprising a shaft journaled in the frame, a sprocket wheel fast on said shaft, a second sprocket wheel rotatably mounted on the frame in advance of the first-named sprocket, an endless chain passing over said sprockets, means for driving said sprockets and chain from the rotatable axle, and means for vertically adjusting the inner end of said reel shaft, said adjusting means comprising a toothed member adjacent the inner or forward end of the reel shaft and turnable relatively thereto, a slotted bracket fixedly secured to the frame and having a portion of its forward edge toothed to form a rack with which said toothed member engages, each end tooth of such rack having its sides more sharply inclined than the other teeth to permit a bodily rocking of the said toothed member when in engagement therewith, the rear edge of said slot being curved at its end portions to compel such bodily rocking of the toothed member, and means for moving said toothed member.

LEON R. CLAUSEN.